United States Patent
Figeys et al.

(10) Patent No.: US 12,130,472 B2
(45) Date of Patent: Oct. 29, 2024

(54) MULTILEVEL COUPLING FOR PHASE FRONT ENGINEERING

(71) Applicant: IMEC VZW, Leuven (BE)

(72) Inventors: Bruno Figeys, Herent (BE); Jon Kjellman, Kongens Lyngby (DK); Roelof Jansen, Heverlee (BE)

(73) Assignee: Imec vzw, Leuven (BE)

( * ) Notice: Subject to any disclaimer, the term of this patent is extended or adjusted under 35 U.S.C. 154(b) by 143 days.

(21) Appl. No.: 18/067,985

(22) Filed: Dec. 19, 2022

(65) Prior Publication Data

US 2023/0194781 A1 Jun. 22, 2023

(30) Foreign Application Priority Data

Dec. 20, 2021 (EP) .................... 21216136

(51) Int. Cl.
*G02B 6/12* (2006.01)
*G02B 6/13* (2006.01)

(52) U.S. Cl.
CPC ..... *G02B 6/12014* (2013.01); *G02B 6/12016* (2013.01); *G02B 6/13* (2013.01)

(58) Field of Classification Search
CPC .. G02B 6/12014; G02B 6/12016; G02B 6/13; G02B 6/12002; G02B 6/1228; G01S 7/4817; G02F 2203/24; G02F 1/292
See application file for complete search history.

(56) References Cited

U.S. PATENT DOCUMENTS

| | | | |
|---|---|---|---|
| 9,081,252 B2 * | 7/2015 | Aflatouni | G02F 1/025 |
| 10,656,496 B2 * | 5/2020 | Hashemi | G02F 1/2955 |
| 2002/0086454 A1 | 7/2002 | Evans et al. | |
| 2008/0068719 A1 | 3/2008 | Hayashi et al. | |
| 2019/0170945 A1 | 6/2019 | Fortusini et al. | |
| 2021/0382235 A1 * | 12/2021 | Puckett | G02B 6/122 |

OTHER PUBLICATIONS

Xu, Weihan, Linjie Zhou, Liangjun Lu, and Jianping Chen. "Aliasing-free optical phased array beam-steering with a plateau envelope." Optics express 27, No. 3 (2019): 3354-3368.
Phare, Christopher T., Min Chul Shin, Steven A. Miller, Brian Stern, and Michal Lipson. "Silicon optical phased array with high-efficiency beam formation over 180 degree field of view." arXiv preprint arXiv:1802.04624 (2018).
Extended European Search Report and Written Opinion, Application No. EP 21216136.8, mailed Jun. 1, 2022, 9 pages.

* cited by examiner

*Primary Examiner* — John Bedtelyon
(74) *Attorney, Agent, or Firm* — McDonnell Boehnen Hulbert & Berghoff LLP

(57) ABSTRACT

Example embodiments relate to multilevel coupling for phase front engineering. An example integrated optical structure for phase front engineering of optical beams includes a substrate. The integrated optical structure also includes a plurality of optical layers formed on the substrate. Each of the optical layers includes an optical phased array that includes a plurality of optical waveguides. Each of the optical layers also includes a coupling section for each of the optical waveguides. Each coupling section is configured to control the phase of an optical beam coupling out of the optical waveguide. Additionally, the integrated optical structure includes a slab waveguide formed on the substrate and between two of the optical layers. The slab waveguide is in optical communication with the coupling sections of the two optical layers. The slab waveguide includes a slab waveguide outcoupling structure.

20 Claims, 7 Drawing Sheets

MULTILEVEL COUPLING FOR PHASE FRONT ENGINEERING

CROSS-REFERENCE TO RELATED APPLICATIONS

The present application is a non-provisional patent application claiming priority to European Patent Application No. EP 21216136.8, filed Dec. 20, 2021, the contents of which are hereby incorporated by reference.

FIELD OF THE DISCLOSURE

The present disclosure generally relates, amongst others, to integrated optical structures and to methods related thereto. More particularly, it relates to integrated optical structures for phase front engineering of optical beams.

BACKGROUND

Mass-scale microfabricated optical waveguides are being considered for various applications such as, for example, spectroscopy, sensing, telecommunications, and optical beamforming. Most of these applications typically rely on the manufacturing of, for example, optical phased arrays, planar lenses, multiplexers and/or demultiplexers, in the form of, for example, arrayed waveguide gratings, echelle gratings, cascaded Mach-Zehnder interferometers, ring resonators, etc. Depending on the specific application, these optical integrated circuits can become rather large.

Optical beamforming technology concerns the ability to steer, shape and focus light. It is a powerful tool to directly manipulate a light signal, e.g., for light detection and ranging (LiDAR) or optical communication. LiDAR is a method for determining ranges by targeting an object with a laser and measuring the time for the reflected light to return to the receiver. Optical beamforming technology is also a powerful tool to indirectly change a radio frequency on an optical carrier, e.g., for 5G, radar. Optical beamforming may be used, for example, for 5G networks which include large, flexible bandwidths and directional communication, which can be provided by integrated microwave photonics. Optical beamforming can also be relevant for free-space optical communication systems which demand high-capacity and secure communication links, both via satellites and remote ground links. Advanced medical applications, such as optical coherence tomography (OCT) scanners, need imaging technologies that enable accurate diagnostics and monitoring, and optical beamforming can play a significant role for these applications.

For beamforming applications, in particular for LiDAR, it is important that the overall insertion loss of the system is reduced as much as possible. The cost, which can be price/electrical power/generated heat, per watt of optically generated power is significant and it is therefore essential to minimize losses as much as possible. For optical phased arrays, also referred to as OPAs, this means that the power emitted in the main lobe should be maximized.

For typical LiDAR applications, a beam divergence significantly smaller than 0.1° may be used. This means that the antenna array for an OPA may be more than 1 mm wide, for example, 1-2 cm, and that the antennas in the OPA may be more than 1 mm long, for example, 1-2 cm. To achieve such long antennas, one typically relies on leaky wave antennas, i.e., very long waveguides with small perturbations. Typically, the antennas in an OPA are placed on a pitch which is larger than the wavelength $\lambda_0$, e.g., 1-2 $\lambda_0$. Although possibly optically non-ideal, this may be done to avoid coupling between the neighboring antennas and their feeding waveguides.

However, implementing antennas in an OPA as discussed above introduces grating lobes which have two main effects. On one hand, this reduces the power in the main lobe since only part of the power is emitted by the main lobe. On the other hand, this means that part of the power is emitted by side grating lobes which could potentially lead to false recordings when beam steering for, for example, LiDAR applications. Another issue with long waveguide antennas is in the accumulation of phase errors. Sidewall roughness of the waveguides introduces phase errors, especially when these are 1-2 cm long. These phase errors reflect into reduction in power in the main lobe.

Additionally, an antenna length of a few millimeters is not sufficiently long for some applications. Therefore, the pitch of the optical phased array may be further reduced, while making the waveguide thickness even wider, which is not an option if one wants to avoid Transverse Electric (TE)/Transverse Magnetic (TM) mode mixing.

To truly achieve a grating lobe free design, the antennas may be on 0.5 $\lambda_0$ pitch. So far, 1-2 cm long antennas on a close to half-wavelength pitch have yet to be successfully implemented. Placing the outputs of the OPAs very close together, by using waveguides of different widths, such that they will not couple, has been demonstrated. However, if one makes antennas from waveguides with different widths and introduces perturbations to emit in the same direction, these antennas will then start coupling since there could be phase matching.

One path could be to engineer the antennas to make them more directive, such that the element factor of one antenna does not emit any power in the direction of the grating lobes. Free space antennas that do are discussed in the publication by Xu et al. entitled "Aliasing-Free Optical Phased Array Beam-Steering with a Plateau Envelope" published in Optics Express 27, no. 3, Feb. 4, 2019, and by the publication by Phare et al. entitled "Silicon Optical Phased Array with High-Efficiency Beam Formation over 180 Degree Field of View" published by Cornell University on Feb. 13, 2018. This would effectively reduce the power emitted by the grating lobes, hence increase the power in the main lobe of the antennas. However, it is still an open question whether this is actually feasible as none of the known designs involve on-chip antennas for integrated optical applications.

SUMMARY

Example embodiments describe an integrated optical structure for phase front engineering of optical beams which do not show the inherent shortcomings of conventional approaches. More specifically, example embodiments describe an integrated optical structure with longer antennas and which maximizes the power in the main lobe of the antennas while minimizing the effects of phase errors for the antennas.

The scope of protection sought for various embodiments is set out by the independent claims.

The embodiments and features described in this specification that do not fall within the scope of the independent claims, if any, are to be interpreted as examples useful for understanding various embodiments.

There is a need for an integrated optical structure for phase front engineering of optical beams that minimizes a pitch for antenna arrays while maximizing a steering range of the antenna arrays and avoiding higher output orders of the antenna arrays without coupling between neighboring waveguides.

Example embodiments allow for the integration of a plurality of waveguides very close together to reach a very small pitch for antennas for applications such as beam steering, while achieving broad steering range and maximizing the power emitted in the main lobe of the antennas.

This can be achieved, according to example embodiments, by an integrated optical structure for phase front engineering of optical beams, wherein the integrated optical structure comprises:
a substrate;
a plurality of optical layers formed on the substrate, wherein each of the optical layers comprises:
an optical phased array comprising a plurality of optical waveguides; and
a coupling section for each of the optical waveguides, wherein each coupling section is configured to control the phase of an optical beam coupling out of the optical waveguide; and
a slab waveguide formed on the substrate and between two of the optical layers, wherein the slab waveguide is in optical communication with the coupling sections of the two optical layers; and wherein the slab waveguide comprises a slab waveguide outcoupling structure configured for transmission of optical beams out of and/or for reception of optical beams into the plane of the substrate.

With the integrated optical structure according to the present disclosure, the optical phased arrays and their corresponding optical waveguides are spread over several optical layers, thereby increasing the spacing between neighboring optical waveguides. In other words, optical phased arrays each comprising a plurality of optical waveguides are comprised in different optical layers arranged on top of each other along a direction transverse to the plane of the substrate, and all the optical phased arrays couple into the slab waveguide positioned between two of the optical layers along the direction transverse to the plane of the substrate. Neighboring optical waveguides can therefore be stacked closer together over different optical levels along the direction transverse to the plane of the substrate without running into coupling issues. A very small pitch for the optical waveguides can be reached without coupling between neighboring waveguides.

With the slab waveguide according to the present disclosure, the power into the main lobe of the antennas can be maximized. Instead of connecting individual antennas to each input sections of the optical phased arrays, with the integrated optical structure according to the present disclosure, an optical beam is first steered in-plane into the slab waveguide and only then is emitted out-of-plane with respect to the plane of the substrate through the slab waveguide outcoupling structure. The use of a slab waveguide according to the present disclosure allows cancelling out grating lobes. Since the effective wavelength in the slab waveguide is smaller than in air, the grating lobes lie closer to the main lobe in the slab waveguide. It is mainly relevant to efficiently use the available power of the optical beam. By adjusting the element factor of the in-plane antennas, i.e., the apertures, the size of the grating lobes can be minimized, and consequently the power loss into the grating lobes can also be minimized. In other words, the apertures into the slab waveguide act as antennas for in-plane beam steering and since the optical waveguides are, for example, on a half-wavelength pitch, the power loss into the grating lobes can be minimized. Additionally, a slab waveguide is less sensitive to phase errors than, for example, the rectangular optical waveguides which are typically used in optical phased arrays. A slab waveguide suffers less from sidewall roughness than rectangular optical waveguides. This further reduces the loss due to phase errors.

With the coupling sections for each of the optical waveguides of the integrated optical structure according to the present disclosure, it becomes possible to engineer the emission shape, the emission pattern, an element factor for each optical waveguide into the slab waveguide. Each coupling section can control the phase of an optical beam coupling out of each optical waveguide. This increases the adaptability and the granularity with which an optical beam may be engineered by the integrated optical structure according to the present disclosure.

In the context of the present disclosure, an optical layer is understood as a layer extending substantially parallel to the plane of the substrate onto which the optical layers are formed. Each optical layer comprises an optical phased array. An optical phased array comprises an array of radiating elements which emit waves which will interfere with one another, such as, for example, acoustic waves, electromagnetic waves, optical waves. By controlling the phase of the waves emitted by the different radiating elements, the wavefront of the wave can be designed to be focusing on a spot in the near field of the antenna array. Alternatively, the wavefront of the wave can be designed to emit light in a well-defined direction. In the context of the present disclosure, the radiating elements of the optical phased arrays, here the coupling sections, emit the optical beam into the slab waveguide. In other words, the radiating elements of the optical phased arrays according to the present disclosure convert a laterally confined waveguide mode into a diverging slab waveguide mode.

In the context of the present disclosure, an optical beam is an electromagnetic wave that remains essentially concentrated around a mean axis upon free propagation or that is guided by one or more suitable structures such as the integrated optical structure according to the present disclosure. An optical beam is, for example, a laser beam. Alternatively, an optical beam is a light beam emitted by a light source, such as, for example, a light emitting diode. An optical beam is, for example, coupled into the input section of one or more optical phased arrays, then propagates along the optical phased arrays, then is coupled from the coupling section to the slab waveguide and finally reaches the slab waveguide outcoupling structure which transmits the optical beam out of the plane of the substrate. Alternatively, an optical beam is, for example, received by the slab waveguide outcoupling structure into the plane of the substrate, then couples from the slab waveguide into one or more coupling sections of the optical phased arrays and finally propagates along the corresponding optical phased arrays. Alternatively, the integrated optical structure according to the present disclosure is configured for simultaneous coupling and propagation of one or more optical beams out of and into the plane of the substrate.

In the context of the present disclosure, a slab waveguide outcoupling structure allows an optical beam to be transmitted out of and/or to be received into the plane of the slab waveguide. A slab waveguide outcoupling structure is, for example, an edge coupler, wherein the optical beam is transmitted to and/or is received from, for example, an optical fiber or another integrated optical structure. Alternatively, a slab waveguide outcoupling structure comprises one or more grating couplers. For example, a slab waveguide outcoupling structure is a grating coupler. Alternatively, a slab waveguide outcoupling structure is a reflector, such as, for example, a mirror.

In the context of the present disclosure, a substrate the substrate comprises one or more of the following: silicon, silicon-on-insulator, silicon carbide, sapphire, silicon nitride, germanium, germanium-on-insulator, III-V materials such as, for example, GaN and/or AlN, generic integrated photonic platforms, generic integrated electronic platforms, diamond, any flexible substrate such as, for example, any polymer, dielectrics, glass, etc.

In the context of the present disclosure, practical rectangular-geometry optical waveguides are most easily understood as variants of a theoretical slab waveguide, also referred to as a planar waveguide. A slab waveguide is formed out of three layers of materials with different dielectric constants, extending in the directions parallel to their interfaces. An optical beam such as light may be confined in the middle layer by total internal reflection. This occurs as the dielectric index of the middle layer is larger than that of the surrounding layers. A slab waveguide is not infinite in the directions 3 and 4 shown on FIG. 1 of the present disclosure. Referring to FIG. 1 of the present disclosure, a typical size of the slab waveguide along the direction 3 and along the direction 4 is much larger than the depth of the slab waveguide along the direction 8 transverse to the plane of the substrate. Guided modes of a slab waveguide cannot be excited by an optical beam incident from the top or bottom interfaces of the slab waveguide. The slab waveguide outcoupling structure acts as a coupling element and may be used to couple light out of and/or into the slab waveguide. The slab waveguide according to the present disclosure confines the optical beams only in one direction, i.e. the direction 8 transverse to the plane of the substrate.

In the context of the present disclosure, an optical waveguide is a physical structure which is adapted to guide electromagnetic waves in the optical spectrum. An optical waveguide is used as a component in integrated optical circuits or as the transmission medium in local and long-haul optical communication systems. In the context of the present disclosure, a plane of the substrate extends in the directions substantially parallel to the interface between the substrate and the optical layers. An optical waveguide in the context of the present disclosure can be classified according to its geometry, for example, planar, strip, or fiber waveguide, its mode structure, for example, single-mode, multi-mode, its refractive index distribution, for example, step or gradient index, and/or its material, for example, glass, polymer, semiconductor such as, for example, silicon, silicon nitride, sapphire, silicon carbide, germanium, III-V materials, etc. A strip waveguide is basically a strip of the optical layer confined between cladding layers. The most straightforward case is a rectangular waveguide, which is formed when the guiding layer of a slab waveguide is restricted in both transverse directions rather than just one. A rib waveguide is a waveguide in which the guiding layer basically consists of a slab with one or more strips superimposed onto it. Rib waveguides also provide confinement of the wave in two dimensions and near-unity confinement is possible in multi-layer rib structures.

In the context of the present disclosure, an optical layer is formed on top of the substrate. One or more optical beams may propagate along the optical layer and remain confined within this optical layer except at the coupling sections for each of the optical waveguides comprised in the optical layer, where the one or more optical beams may be coupled from the optical layer to the slab waveguide and from the slab waveguide to the optical layer.

In the context of the present disclosure, the slab waveguide is formed on the substrate and between two of the optical layers. When the integrated optical structure comprises two optical layers, the slab waveguide is formed between the two optical layers. This way, along the direction 8 as shown on FIG. 1 of the present disclosure, the integrated optical structure first comprises a substrate, a first optical layer formed on top of the substrate, the slab waveguide formed on top of the first optical layer and a second optical layer formed on top of the slab waveguide. The coupling sections of the first optical layer and the coupling sections of the second optical layer are all in optical communication with the slab waveguide, i.e. they all couple to the slab waveguide. This way, the slab waveguide is symmetrically centered between the optical layers such that there are as many optical layers on top of the slab waveguide along the direction 8 shown in FIG. 1 of the present disclosure as the number of optical layers below the slab waveguide along the direction 8 shown in FIG. 1 of the present disclosure.

According to example embodiments, the coupling sections of the optical layers are further configured to optically couple optical beams to and/or from the slab waveguide.

There is a coupling section provided for each of the optical waveguides of each optical phased array of each optical layer, wherein each coupling section is configured to control the phase of an optical beam coupling out of the optical waveguide. Each coupling section of the integrated optical structure is in optical communication with the slab waveguide, i.e. each coupling section is configured to optically couple optical beams to and/or from the slab waveguide.

According to example embodiments, each coupling section further comprises a phase shifter.

This way, each coupling section is configured to control the phase of an optical beam coupling out of the optical waveguide. Introducing phase shifters between the optical waveguides and the input of the slab waveguide makes it possible to gain accurate control over the emitting phase shift. This allows correcting for phase errors introduced, for example, by processing variations. Each optical waveguide comprises a phase shifter on top of the optical waveguide along the direction 8 shown in FIG. 1 of the present disclosure.

According to example embodiments, the coupling sections of the optical layers are identical.

This way, all the optical waveguides of the optical layers couple in a similar way to the slab waveguide.

According to example embodiments, the optical waveguides within each of the optical layers are periodically spaced in the plane of the substrate.

The optical waveguides within each of the optical layers are, for example, arranged with a constant pitch along the direction 4 shown on FIG. 1 of the present disclosure. In some embodiments, the optical waveguides within an optical layer are spaced by $$\frac{\lambda_0}{2n_{slab}},$$

wherein $n_{slab}$ is the effective mode index in the slab waveguide. A distance along the direction 4 shown on FIG. 1 of the present disclosure between two adjacent optical waveguides within one optical layer may be equal to or larger than $$\frac{\lambda_0}{2}.$$

A distance along the direction 4 shown on FIG. 1 of the present disclosure between two adjacent optical waveguides within each optical layer of the integrated optical structure may be equal to or larger than $$\frac{\lambda_0}{2}.$$

According to example embodiments, the optical waveguides of the two optical layers are in offset with respect to each other along a direction transverse to the substrate by half a period of the spacing of the optical waveguides within one of the coupling section.

According to example embodiments, each of the coupling sections comprises a taper.

This way, the losses when coupling to and from the optical layers to the slab waveguide are minimized. Additionally, the opening angle is maximized. A taper has a length along the direction 3 show in FIG. 1 of the present disclosure comprised between 1 and 100 µm. A taper could comprise a different material than the optical waveguide to which it is associated. A taper is, for example, linear along the direction 3 show in FIG. 1 of the present disclosure. Alternatively, a taper is, for example, curved along the directions 3 and 4 shown in FIG. 1 of the present disclosure.

According to example embodiments, the integrated optical structure further comprises one or more intermediate coupling layers, wherein each intermediate coupling layer is formed on the substrate between one of the two optical layers and the slab waveguide; wherein each of the intermediate coupling layers is configured to be in optical communication with one of the coupling sections of one of the optical layers and with the slab waveguide outcoupling structure.

This way, more space is introduced between the optical layers, which are now separated from each other along the direction 8 shown in FIG. 1 of the present disclosure by the slab waveguide and by one or more intermediate layers. This further reduces the coupling between the optical waveguides of the two optical layers. In some embodiments, the slab waveguide is symmetrically centered between the layers such that there are as many intermediate coupling layers and optical layers on top of the slab waveguide along the direction 8 shown in FIG. 1 of the present disclosure as the number of intermediate coupling layers and optical layers below the slab waveguide along the direction 8 shown in FIG. 1 of the present disclosure. Alternatively, the slab waveguide is not symmetrically centered between the layers and there are more layers above the slab waveguide along the direction 8 shown in FIG. 1 of the present disclosure than below.

According to example embodiments, each of the intermediate coupling layers comprises a plurality of intermediate waveguides; and wherein each intermediate waveguide is in optical communication with one of the optical waveguides at its coupling section and with the slab waveguide outcoupling structure.

An intermediate coupling layer comprises a plurality of intermediate waveguides and, for each intermediate waveguide, an intermediate coupling section configured to control the phase of an optical beam coupling out of the intermediate waveguide. Alternatively, an intermediate coupling layer comprises an intermediate slab waveguide.

According to example embodiments, the slab waveguide further comprises one or more optical phased arrays.

The slab waveguide comprises one or more optical phased arrays, wherein each optical phased arrays comprises a plurality of optical waveguides.

According to example embodiments, the slab waveguide further comprises one or more phase interrogators.

This way, the phase of the optical beam coupling out of an optical waveguide can be checked by a phase interrogator.

According to example embodiments, the optical waveguides within one of the optical layers have different dimensions along the plane of the substrate and/or wherein the intermediate waveguides within one or more of the intermediate coupling layers have different dimensions along the plane of the substrate.

For example, one or more optical waveguides and/or one or more intermediate waveguides have different widths along the direction 4 shown on FIG. 1 of the present disclosure transverse to the direction 8 transverse to the plane of the substrate. For example, one or more optical waveguides and/or one or more intermediate waveguides have different heights along the direction 8 shown on FIG. 1 of the present disclosure transverse to the plane of the substrate. For example, three waveguide widths along the direction 4 shown in FIG. 1 of the present disclosure may be used so that the optical waveguides do not couple to each other and/or such that the intermediate waveguides do not couple to each other. To make sure each phase shifter behaves identical and that the optical path length in each optical waveguide is the same, it is possible to cycle the waveguide widths along the direction 4 shown on FIG. 1 of the present disclosure through the phase shifter. The transitions between the different waveguide widths may be gradually tapered.

According to example embodiments, each of the optical phased arrays comprises:
an input section; and
a splitting section in optical communication with the input section and with the coupling sections.

The splitting section comprises, for example, a power divider which can be, for example, a splitter tree network for equal or unequal power distribution. Alternatively, the splitting section comprises a star coupler to gradually spread the power. Alternatively, an optical phased array in the context of the present disclosure comprises a Rotman lens. A Rotman lens comprises an input section, a free propagation region and a set of transmission lines of a certain length connected on one end to the free propagation region and on to the other end to an antenna. The transmission lines are straight with varying index. Where the transmission lines have nearly all the same length, the average index is realized by having the transmission line made of two different sections. When working with two or more different transmission lines, i.e., with different propagation velocity, a broad range of indices can be realized in integrated photonics.

According to example embodiments, the optical layers operate at different wavelengths.

Some ranging applications include large wavelength variation, for example, of 100 nm or more, for one of the beam steering directions. This can become problematic for two reasons. First, components are not broadband enough. Second, high power lasers with large wavelength tunability are expensive/nonexistent. Alternatively, there are applications in which one may want to generate a certain optical beam or focused spot with two different wavelengths. For both applications it may be interesting to have two optical phased arrays dedicated to their respective target wavelength range, with their own optimized laser sources/detectors/and other components, such as optical waveguides. Imagine one would want to make a beamforming device which can emit at the same time light with $\lambda_0=1550$ nm and visible light. For near-infrared (NIR) light one may want to use silicon as a waveguiding layer, for compactness and for visible light one may one to use SiN, or $NbO_x$, or $TiO_x$, or AlN optical waveguides. It would then be possible to give each of the optical phased arrays its own dedicated optical layer, and only share the emitting region, i.e., the slab waveguide. The transitions into the slab waveguide could comprise wavelength sensitive couplers. It is possible to make an integrated optical structure which couples efficiently wavelength A from the slab waveguide into the top optical layer along the direction 8 shown in FIG. 1 of the present disclosure, while wavelength B is coupled efficiently to the bottom optical layer along the direction 8 shown in FIG. 1 of the present disclosure. Such an integrated optical structure would be very similar to a directional coupler-based wavelength demultiplexer.

According to a second example aspect of the present disclosure, there is provided a method for manufacturing an optical integrated structure, wherein the method comprises the steps of:
  providing a substrate;
  forming a plurality of optical layers on the substrate, wherein each of the optical layers comprises:
    an optical phased array comprising a plurality of optical waveguides; and
    a coupling section for each of the optical waveguides, wherein each coupling section is configured to control the phase of an optical beam coupling out of the optical waveguide; and
  forming a slab waveguide on the substrate and between two of the optical layers, wherein the slab waveguide is in optical communication with the coupling sections of the two optical layers; and wherein the slab waveguide comprises a slab waveguide outcoupling structure configured for transmission of optical beams out of and/or for reception of optical beams into the plane of the substrate.

With the method for manufacturing an optical integrated structure according to the present disclosure, the optical phased arrays and their corresponding optical waveguides are spread over several optical layers, thereby increasing the spacing between neighboring optical waveguides. In other words, optical phased arrays each comprising a plurality of optical waveguides are comprised in different optical layers arranged on top of each other along a direction transverse to the plane of the substrate, and all the optical phased arrays couple into the slab waveguide positioned between two of the optical layers along the direction transverse to the plane of the substrate. Neighboring optical waveguides can therefore be stacked closer together over different optical levels along the direction transverse to the plane of the substrate without running into coupling issues. A very small pitch for the optical waveguides can be reached without coupling between neighboring waveguides.

With the slab waveguide manufactured with the method according to the present disclosure, the power into the main lobe of the antennas can be maximized. Instead of connecting individual antennas to each input sections of the optical phased arrays, with the integrated optical structure according to the present disclosure, an optical beam is first steered in-plane into the slab waveguide and only then is emitted out-of-plane with respect to the plane of the substrate through the slab waveguide outcoupling structure. The use of a slab waveguide allows cancelling out grating lobes. Since the effective wavelength in the slab waveguide is smaller than in air, the grating lobes lie closer to the main lobe in the slab waveguide. It is mainly relevant to efficiently use the available power of the optical beam. By adjusting the element factor of the in-plane antennas, i.e., the apertures, the size of the grating lobes can be minimized, and consequently the power loss into the grating lobes can also be minimized. In other words, the apertures into the slab waveguide act as antennas for in-plane beam steering and since the optical waveguides are, for example, on a half-wavelength pitch, the power loss into the grating lobes can be minimized. Additionally, a slab waveguide is less sensitive to phase errors than, for example, the rectangular optical waveguides which are typically used in optical phased arrays. A slab waveguide suffers less from sidewall roughness than rectangular optical waveguides. This further reduces the loss due to phase errors.

With the coupling sections for each of the optical waveguides of the integrated optical structure manufactured by the method according to the present disclosure, it becomes possible to engineer the emission shape, the emission pattern, an element factor for each optical waveguide into the slab waveguide. Each coupling section can control the phase of an optical beam coupling out of each optical waveguide. This increases the adaptability and the granularity with which an optical beam may be engineered by the integrated optical structure according to the present disclosure.

According to a second example aspect of the present disclosure, there is provided a method for using an integrated optical structure according to a second example aspect of the present disclosure, wherein the method comprises the steps of:
  emitting a first optical beam in a first optical layer of the integrated optical structure;
  allowing the first optical beam to couple from the first optical layer into the slab waveguide;
  transmitting the first optical beam out of the plane of the substrate via the slab waveguide outcoupling structure;
  receiving a second optical beam into the plane of the substrate via the slab waveguide outcoupling structure; wherein the second optical beam corresponds to the first optical beam having been reflected; and
  allowing the second optical beam to couple from the slab waveguide into a second optical layer of the integrated optical structure.

For most applications it is important to be able to emit and to receive optical beams such as light. In beamforming for ranging applications, there are several techniques to realize this. Two main categories can be identified, time of flight, also known as ToF, and frequency-modulated continuous-wave, also known as FMCW. In ToF, a very short pulse of light is emitted to the scene, and the time interval for the reflected light to return to the observer is measured to quantify the distance between the observer and the reflecting object. In FMCW a continuous wave is being emitted by the observer, the wavelength/frequency of the light is however gradually varied over time. Hence by the time the reflected light returns to the observed the source/observer wavelength has slightly changed with time. To quantify the distance between the observer and the reflecting object it suffices to interfere the reflected light with the current source light. The beating frequency gives a measure for the distance between the reflecting object and the observer. Now, in both techniques it may be the case that the observer emits and receives light. The integrated optical structure, i.e., the beamforming chip can be used for either emitting, either receiving or for both, depending on the overall system characteristics. If one emits and receives light with the beamforming chip, one obtains a very high signal-to-noise ratio (SNR), however one will need to be able to scan the scene rather fast. For a 1-optical phased array-comprising integrated optical structure a measurement procedure would be: emit light signal, wait for pulse retrieval, receive reflected light, reset phases for next position and emit light signal. For an optical phased array-comprising integrated optical structure a measurement procedure could be:

| First optical phased array of one optical layer | Second optical phased array of another optical layer different from the optical layer comprising the first optical phased array |
| --- | --- |
| Emit light signal | Reset phases for next position |
| Reset phases for next position | Receive reflected light |
| Emit light signal | Reset phases for next position |

This could be highly beneficial when the time for resetting the phases of the optical phased array is on the same order of magnitude or longer than send/and receive time. However, this approach would come at the cost of at least 3 dB insertion loss since light that is emitted by the first optical phased array of one optical layer will also be received by the first optical phased array of one optical layer with the same efficiency. This may be the case unless there would be a built-in circulator in the transitions between the slab waveguide to the optical waveguides. Hence, while in most applications one may want to use an optical phased array in the emit and receive path of the device. It can be appealing to re-use the typically very large emitting area.

BRIEF DESCRIPTION OF THE DRAWINGS

Some example embodiments will now be described with reference to the accompanying drawings.

DETAILED DESCRIPTION

Figure 1:
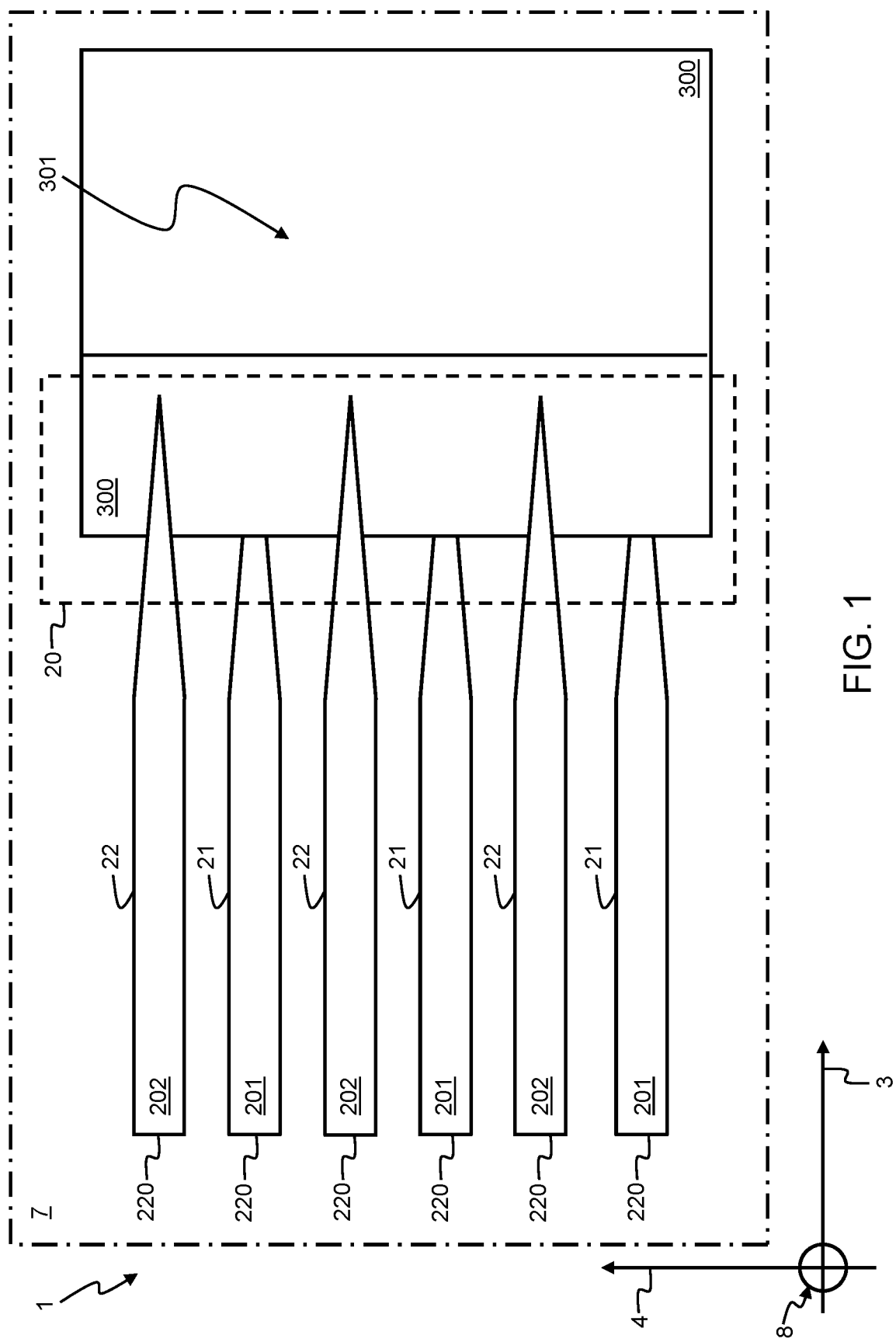
FIG. 1 depicts a top view of an integrated optical structure, according to example embodiments.

FIG. 1 illustrates a top view of an example embodiment of an integrated optical structure 1 for phase front engineering of optical beams according to the present disclosure. An integrated optical structure 1 comprises a substrate onto which a plurality of optical layers 201;202 are formed. A plane 7 of a substrate 100 extends along the longitudinal direction 3 and along the transverse direction 4. The depth direction 8 is transverse to the longitudinal direction 3 and to the transverse direction 4. Each optical layer 201;202 comprises an optical phased array 21;22 and a coupling section 20. Each optical phased array 21;22 comprises a plurality of waveguides 220. A coupling section 20 is provided for each optical waveguide 220. Each coupling section 20 is configured to control the phase of an optical beam coupling out of the optical waveguide 220. The integrated optical structure 1 further comprises a slab waveguide 300 formed on the substrate and between the two optical layers 201;202. The slab waveguide 300 is in optical communication with the coupling sections 20 of the two optical layers 201;202. The slab waveguide 300 comprises a slab waveguide outcoupling structure 301 configured for transmission of optical beams out of and/or for reception of optical beams into the plane 7 of the substrate. The coupling sections 20 of the optical layers 201;202 optically coupled the optical beams to and/or from the slab waveguide 300. The coupling sections 20 are identical. The coupling sections 20 are, for example, tapered, such as shown. The optical waveguides 220 within each optical layer 201;202 are periodically spaced in the plane 7 of the substrate 100. In other words, the optical waveguides 220 within the optical layer 201 are periodically spaced along the direction 4 and the optical waveguides 220 within the optical layer 202 are periodically spaced along the direction 4. The optical waveguides 220 of the two optical layers 201;202 are in offset with respect to each other along the direction 4 by half a period of the spacing of the optical waveguides 220 within one of the coupling section 20. The optical waveguides 220 within one of the optical layers 201;202 may have different dimensions along, for example, the transverse direction 4 and/or the depth direction 8. The two optical layers 201;202 may operate at different wavelengths.

Figure 2:
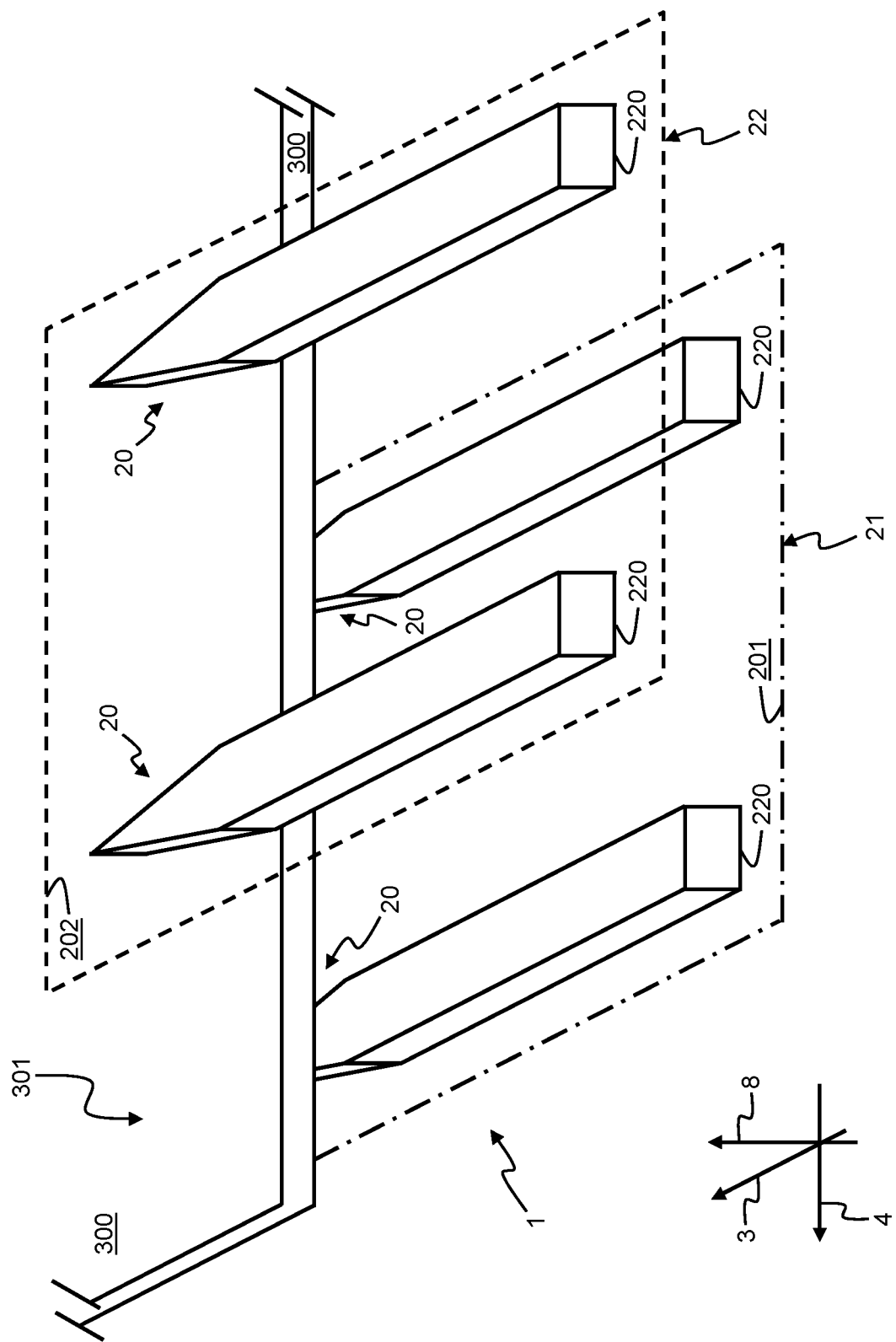
FIG. 2 depicts a perspective side view of an integrated optical structure, according to example embodiments.

FIG. 2 illustrates a perspective side view of an example embodiment of an integrated optical structure 1 for phase front engineering of optical beams according to the present disclosure. Components having similar reference numbers than on FIG. 1 fulfill the same function. An integrated optical structure 1 comprises a substrate onto which a plurality of optical layers 201;202 are formed. A plane of a substrate 7 extends along the longitudinal direction 3 and along the transverse direction 4. The depth direction 8 is transverse to the longitudinal direction 3 and to the transverse direction 4. Each optical layer 201;202 comprises an optical phased array 21;22 and a coupling section 20. Each optical phased array 21;22 comprises a plurality of waveguides 220. A coupling section 20 is provided for each optical waveguide 220. Each coupling section 20 is configured to control the phase of an optical beam coupling out of the optical waveguide 220. The integrated optical structure 1 further comprises a slab waveguide 300 formed on the substrate and between the two optical layers 201;202. The slab waveguide 300 is in optical communication with the coupling sections 20 of the two optical layers 201;202. The slab waveguide 300 comprises a slab waveguide outcoupling structure 301 configured for transmission of optical beams out of and/or for reception of optical beams into the plane 7 of the substrate. The coupling sections 20 of the optical layers 201;202 optically coupled the optical beams to and/or from the slab waveguide 300. The coupling sections 20 are identical. The coupling sections 20 are, for example, tapered, such as shown. The optical waveguides 220 within each optical layer 201;202 are periodically spaced in the plane 7 of the substrate 100. In other words, the optical waveguides 220 within the optical layer 201 are periodically spaced along the direction 4 and the optical waveguides 220 within the optical layer 202 are periodically spaced along the direction 4. The optical waveguides 220 of the two optical layers 201;202 are in offset with respect to each other along the direction 4 by half a period of the spacing of the optical waveguides 220 within one of the coupling section 20. The optical waveguides 220 within one of the optical layers 201;202 may have different dimensions along, for example, the transverse direction 4 and/or the depth direction 8. The two optical layers 201;202 may operate at different wavelengths.

Figure 3:
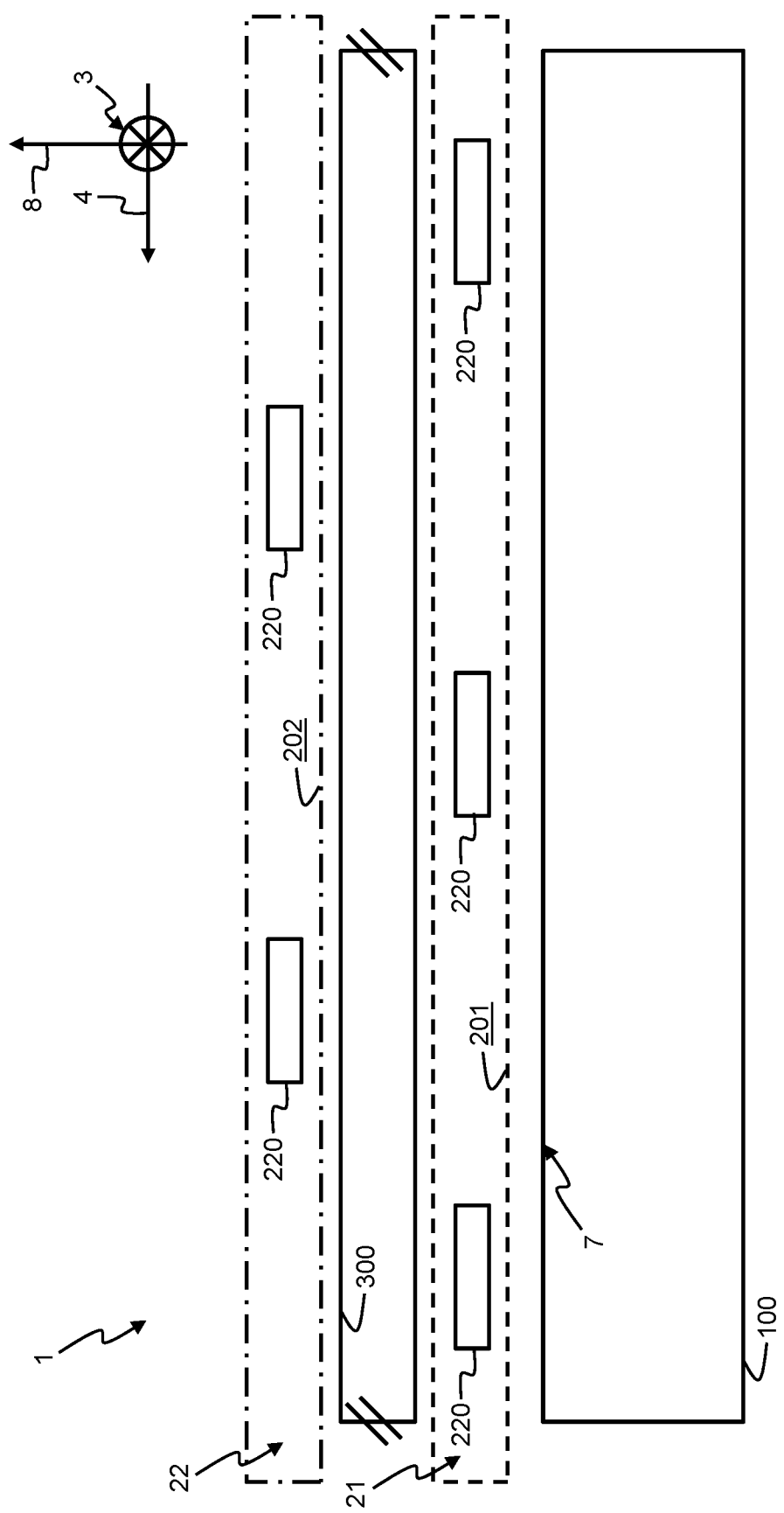
FIG. 3 shows a cross-section of an integrated optical structure that includes two optical layers, according to example embodiments.

FIG. 3 illustrates a cross-section view along the depth direction 8 transverse to the plane 7 of the substrate 100 of an example embodiment of an integrated optical structure 1 for phase front engineering of optical beams according to the present disclosure. Components having similar reference numbers than on FIG. 1 or FIG. 2 fulfill the same function. An integrated optical structure 1 comprises a substrate onto which a plurality of optical layers 201;202 are formed. A plane 7 of a substrate 100 extends along the longitudinal direction 3 and along the transverse direction 4. The depth direction 8 is transverse to the longitudinal direction 3 and to the transverse direction 4. Each optical layer 201;202 comprises an optical phased array 21;22 and a coupling section 20. Each optical phased array 21;22 comprises a plurality of waveguides 220. A coupling section 20 is provided for each optical waveguide 220. Each coupling section 20 is configured to control the phase of an optical beam coupling out of the optical waveguide 220. The integrated optical structure 1 further comprises a slab waveguide 300 formed on the substrate and between the two optical layers 201;202. The slab waveguide 300 is in optical communication with the coupling sections 20 of the two optical layers 201;202. The slab waveguide 300 comprises a slab waveguide outcoupling structure 301 configured for transmission of optical beams out of and/or for reception of optical beams into the plane 7 of the substrate. The coupling sections 20 of the optical layers 201;202 optically coupled the optical beams to and/or from the slab waveguide 300. The coupling sections 20 are identical. The coupling sections 20 are, for example, tapered, such as shown. The optical waveguides 220 within each optical layer 201;202 are periodically spaced in the plane 7 of the substrate 100. In other words, the optical waveguides 220 within the optical layer 201 are periodically spaced along the direction 4 and the optical waveguides 220 within the optical layer 202 are periodically spaced along the direction 4. The optical waveguides 220 of the two optical layers 201;202 are in offset with respect to each other along the direction 4 by half a period of the spacing of the optical waveguides 220 within one of the coupling section 20. The optical waveguides 220 within one of the optical layers 201;202 may have different dimensions along, for example, the transverse direction 4 and/or the depth direction 8. The two optical layers 201;202 may operate at different wavelengths.

Figure 4:
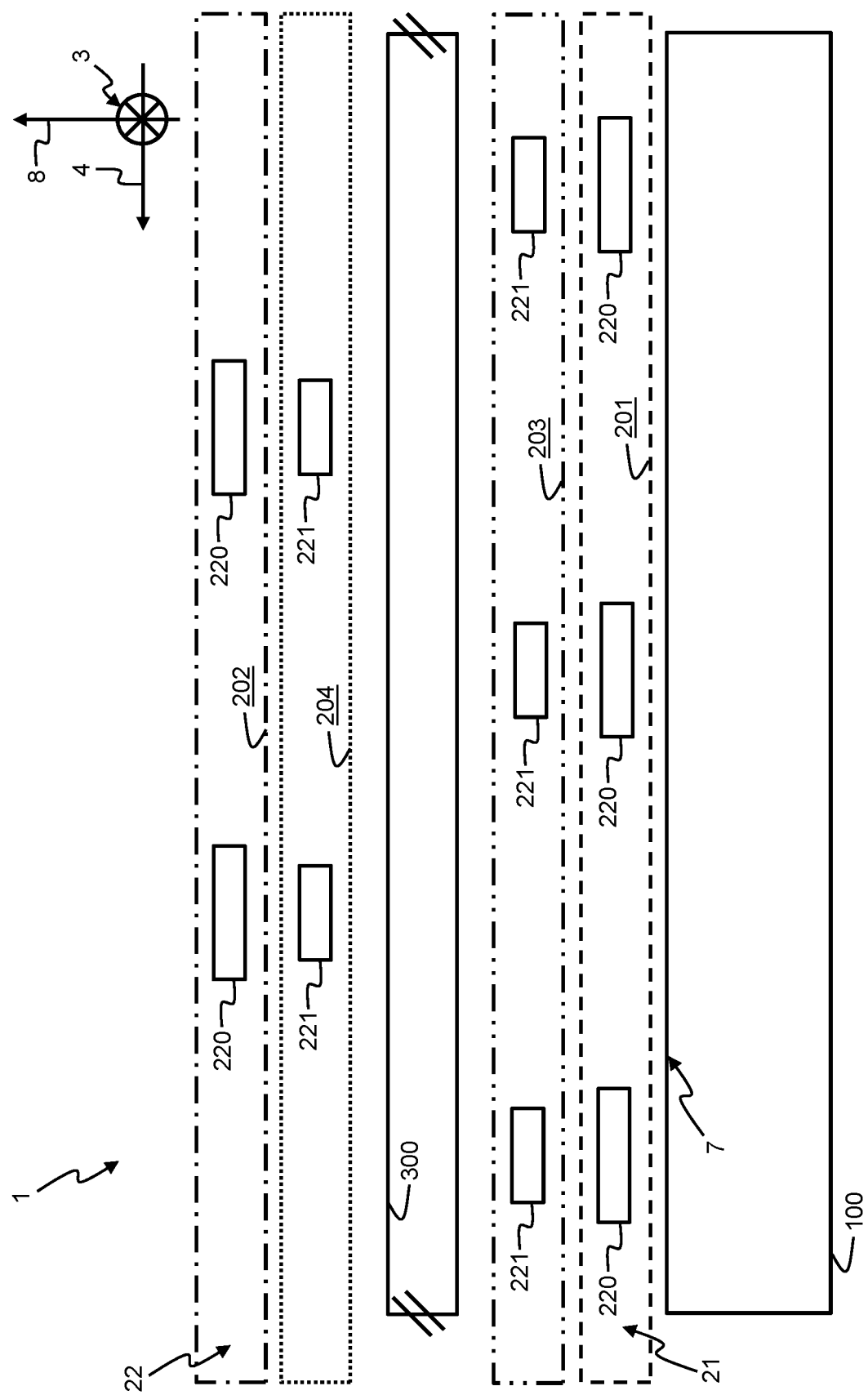
FIG. 4 shows a cross-section of an integrated optical structure that includes two optical layers and two intermediate coupling layers, according to example embodiments.
Figure 5:
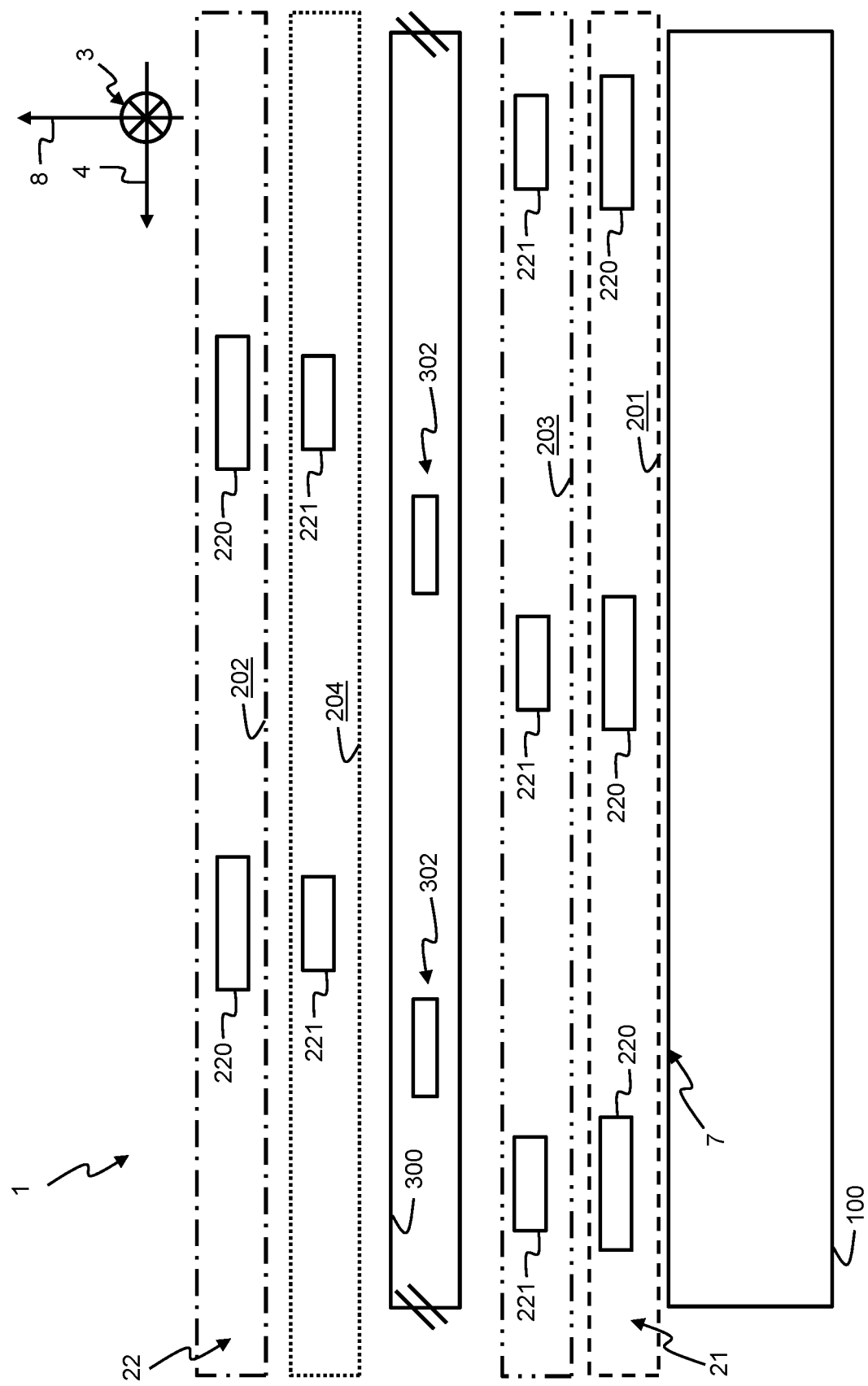
FIG. 5 shows a cross-section of an integrated optical structure that includes two optical layers and two intermediate coupling layers, and where the slab waveguide includes one or more optical phased arrays, according to example embodiments.

FIG. 4 illustrates a cross-section view along the depth direction 8 transverse to the plane 7 of the substrate of an example embodiment of an integrated optical structure 1 for phase front engineering of optical beams according to the present disclosure. Components having similar reference numbers than on FIG. 1 or FIG. 2 or FIG. 3 fulfill the same function. An integrated optical structure 1 comprises a substrate onto which a plurality of optical layers 201;202 are formed. A plane 7 of a substrate 100 extends along the longitudinal direction 3 and along the transverse direction 4. The depth direction 8 is transverse to the longitudinal direction 3 and to the transverse direction 4. Each optical layer 201;202 comprises an optical phased array 21;22 and a coupling section. Each optical phased array 21;22 comprises a plurality of waveguides 220. A coupling section is provided for each optical waveguide 220. Each coupling section is configured to control the phase of an optical beam coupling out of the optical waveguide 220. The integrated optical structure 1 further comprises a slab waveguide 300 formed on the substrate and between the two optical layers 201;202. The slab waveguide 300 is in optical communication with the coupling sections of the two optical layers 201;202. The slab waveguide 300 comprises a slab waveguide outcoupling structure 301 configured for transmission of optical beams out of and/or for reception of optical beams into the plane 7 of the substrate. The coupling sections of the optical layers 201;202 optically coupled the optical beams to and/or from the slab waveguide 300. The coupling sections are identical. The coupling sections are, for example, tapered, such as shown. The optical waveguides 220 within each optical layer 201;202 are periodically spaced in the plane 7 of the substrate 100. In other words, the optical waveguides 220 within the optical layer 201 are periodically spaced along the direction 4 and the optical waveguides 220 within the optical layer 202 are periodically spaced along the direction 4. The optical waveguides 220 of the two optical layers 201;202 are in offset with respect to each other along the direction 4 by half a period of the spacing of the optical waveguides 220 within one of the coupling section. The optical waveguides 220 within one of the optical layers 201;202 may have different dimensions along, for example, the transverse direction 4 and/or the depth direction 8. The two optical layers 201;202 may operate at different wavelengths. The integrated optical structure 1 further comprises one or more intermediate coupling layers 203;204. Each intermediate coupling layers 203;204 is formed on the substrate 100 between one of the optical layers 201;202 and the slab waveguide 300. Each intermediate coupling layers 203;204 is in optical communication with one of the coupling sections of one of the optical layers 201;202 and with the slab waveguide outcoupling structure. Each intermediate coupling layers 203;204 comprises a plurality of intermediate waveguides 221. Each intermediate waveguide 221 is in optical communication with one of the optical waveguides 220 at its coupling section and with the slab waveguide outcoupling structure.

FIG. 4 illustrates a cross-section view along the depth direction 8 transverse to the plane 7 of the substrate of an example embodiment of an integrated optical structure 1 for phase front engineering of optical beams according to the present disclosure. Components having similar reference numbers than on FIG. 1 or FIG. 2 or FIG. 3 or FIG. 4 fulfill the same function. An integrated optical structure 1 comprises a substrate onto which a plurality of optical layers 201;202 are formed. A plane 7 of a substrate 100 extends along the longitudinal direction 3 and along the transverse direction 4. The depth direction 8 is transverse to the longitudinal direction 3 and to the transverse direction 4. Each optical layer 201;202 comprises an optical phased array 21;22 and a coupling section. Each optical phased array 21;22 comprises a plurality of waveguides 220. A coupling section is provided for each optical waveguide 220. Each coupling section is configured to control the phase of an optical beam coupling out of the optical waveguide 220. The integrated optical structure 1 further comprises a slab waveguide 300 formed on the substrate and between the two optical layers 201;202. The slab waveguide 300 is in optical communication with the coupling sections of the two optical layers 201;202. The slab waveguide 300 comprises a slab waveguide outcoupling structure 301 configured for transmission of optical beams out of and/or for reception of optical beams into the plane 7 of the substrate. The coupling sections of the optical layers 201;202 optically coupled the optical beams to and/or from the slab waveguide 300. The coupling sections are identical. The coupling sections are, for example, tapered, such as shown. The optical waveguides 220 within each optical layer 201;202 are periodically spaced in the plane 7 of the substrate 100. In other words, the optical waveguides 220 within the optical layer 201 are periodically spaced along the direction 4 and the optical waveguides 220 within the optical layer 202 are periodically spaced along the direction 4. The optical waveguides 220 of the two optical layers 201;202 are in offset with respect to each other along the direction 4 by half a period of the spacing of the optical waveguides 220 within one of the coupling section. The optical waveguides 220 within one of the optical layers 201;202 may have different dimensions along, for example, the transverse direction 4 and/or the depth direction 8. The two optical layers 201;202 may operate at different wavelengths. The integrated optical structure 1 further comprises one or more intermediate coupling layers 203;204. Each intermediate coupling layers 203;204 is formed on the substrate 100 between one of the optical layers 201;202 and the slab waveguide 300. Each intermediate coupling layers 203;204 is in optical communication with one of the coupling sections of one of the optical layers 201;202 and with the slab waveguide outcoupling structure. Each intermediate coupling layers 203;204 comprises a plurality of intermediate waveguides 221. Each intermediate waveguide 221 is in optical communication with one of the optical waveguides 220 at its coupling section and with the slab waveguide outcoupling structure. The slab waveguide 300 further comprises one or more optical phased arrays 302, wherein the optical phased arrays 302 comprise a plurality of optical waveguides.

Figure 6:
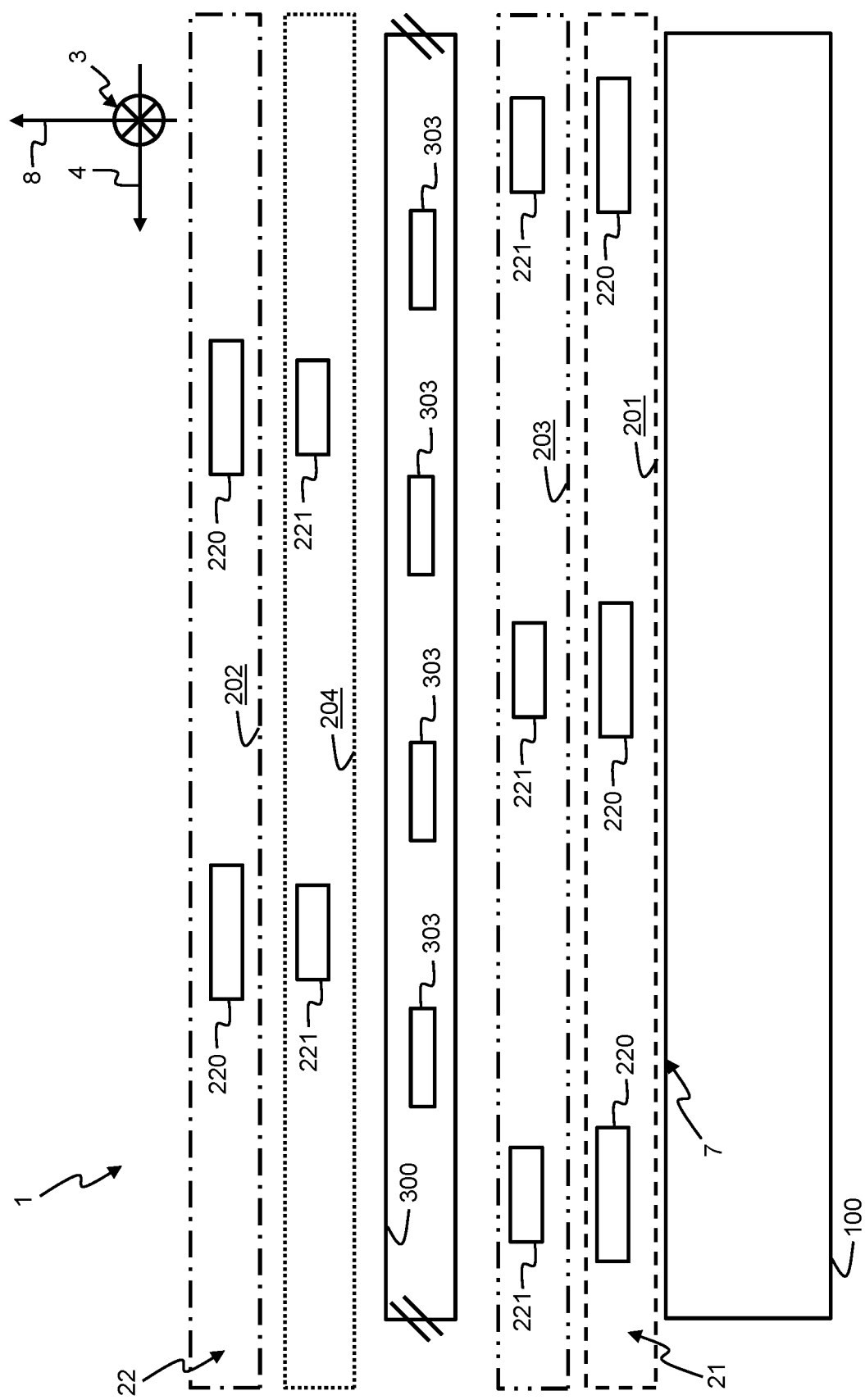
FIG. 6 shows a cross-section of an integrated optical structure that includes two optical layers and two intermediate coupling layers, where the slab waveguide inclues one or more phase interrogators, according to example embodiments.

FIG. 6 illustrates a cross-section view along the depth direction 8 transverse to the plane 7 of the substrate of an example embodiment of an integrated optical structure 1 for phase front engineering of optical beams according to the present disclosure. Components having similar reference numbers than on FIG. 1 or FIG. 2 or FIG. 3 or FIG. 4 or FIG. 5 fulfill the same function. An integrated optical structure 1 comprises a substrate onto which a plurality of optical layers 201;202 are formed. A plane 7 of a substrate 100 extends along the longitudinal direction 3 and along the transverse direction 4. The depth direction 8 is transverse to the longitudinal direction 3 and to the transverse direction 4. Each optical layer 201;202 comprises an optical phased array 21;22 and a coupling section. Each optical phased array 21;22 comprises a plurality of waveguides 220. A coupling section is provided for each optical waveguide 220. Each coupling section is configured to control the phase of an optical beam coupling out of the optical waveguide 220. The integrated optical structure 1 further comprises a slab waveguide 300 formed on the substrate and between the two optical layers 201;202. The slab waveguide 300 is in optical communication with the coupling sections of the two optical layers 201;202. The slab waveguide 300 comprises a slab waveguide outcoupling structure 301 configured for transmission of optical beams out of and/or for reception of optical beams into the plane 7 of the substrate. The coupling sections of the optical layers 201;202 optically coupled the optical beams to and/or from the slab waveguide 300. The coupling sections are identical. The coupling sections are, for example, tapered, such as shown. The optical waveguides 220 within each optical layer 201;202 are periodically spaced in the plane 7 of the substrate 100. In other words, the optical waveguides 220 within the optical layer 201 are periodically spaced along the direction 4 and the optical waveguides 220 within the optical layer 202 are periodically spaced along the direction 4. The optical waveguides 220 of the two optical layers 201;202 are in offset with respect to each other along the direction 4 by half a period of the spacing of the optical waveguides 220 within one of the coupling section. The optical waveguides 220 within one of the optical layers 201;202 may have different dimensions along, for example, the transverse direction 4 and/or the depth direction 8. The two optical layers 201;202 may operate at different wavelengths. The integrated optical structure 1 further comprises one or more intermediate coupling layers 203;204. Each intermediate coupling layers 203;204 is formed on the substrate 100 between one of the optical layers 201;202 and the slab waveguide 300. Each intermediate coupling layers 203;204 is in optical communication with one of the coupling sections of one of the optical layers 201;202 and with the slab waveguide outcoupling structure. Each intermediate coupling layers 203;204 comprises a plurality of intermediate waveguides 221. Each intermediate waveguide 221 is in optical communication with one of the optical waveguides 220 at its coupling section and with the slab waveguide outcoupling structure. The slab waveguide 300 further comprises one or more phase interrogators 303.

Figure 7:
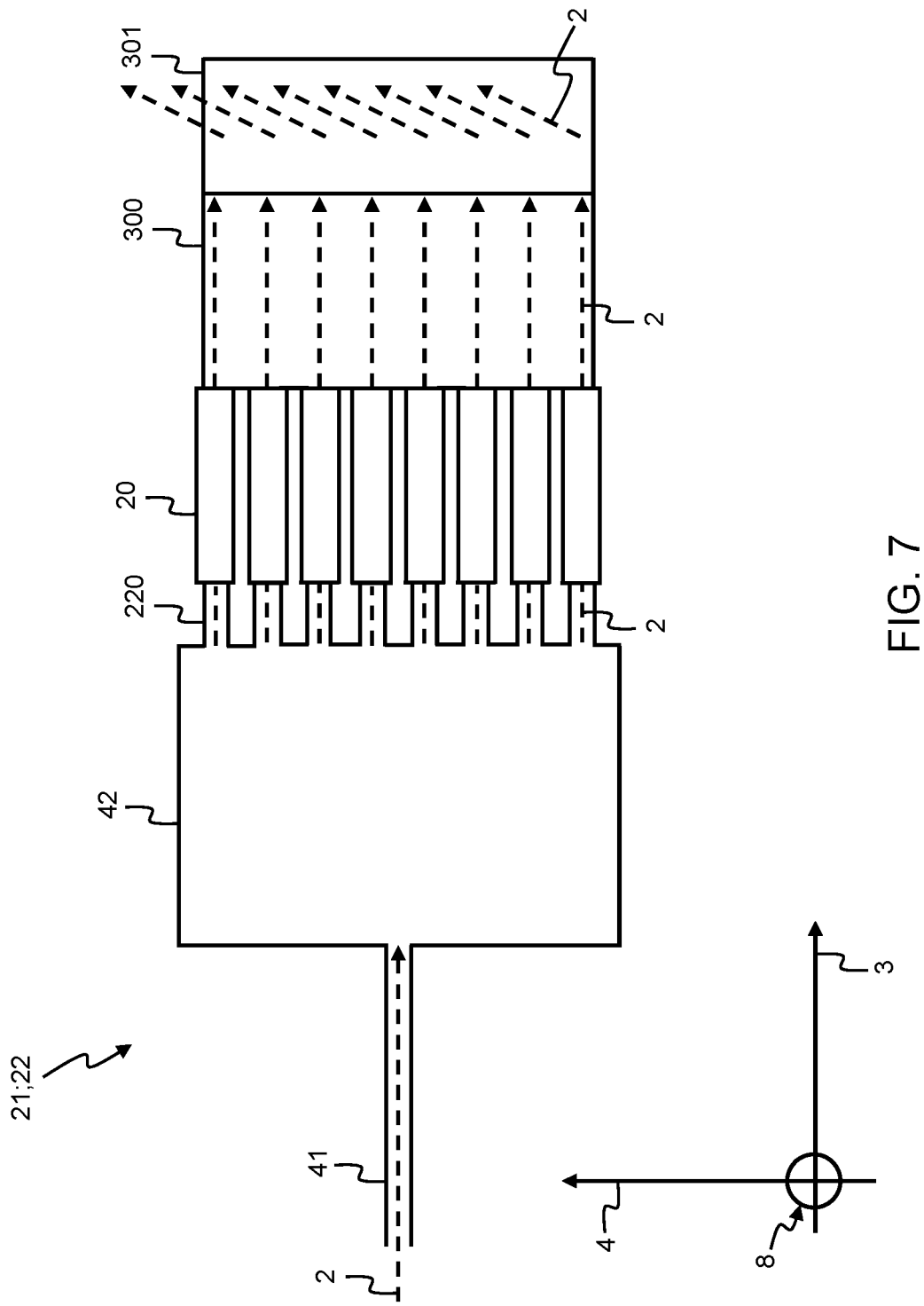
FIG. 7 depicts a top view of an optical phased array, according to example embodiments.

FIG. 7 illustrates a top view of an example embodiment of an optical phased array 21;22 for phase front engineering of optical beams 2 according to the present disclosure. Components having similar reference numbers than on FIG. 1 or FIG. 2 or FIG. 3 or FIG. 4 or FIG. 5 or FIG. 6 fulfill the same function. An optical phased array 21;22 comprises an input section 41 and a splitting section 42 in optical communication with the input section 41 and also in optical communication with the coupling sections 20. Each optical phased array 21;22 comprises a plurality of waveguides 220. A coupling section 20 is provided for each optical waveguide 220. Each coupling section 20 is configured to control the phase of an optical beam 2 coupling out of the optical waveguide 220. For example, each coupling section 20 comprises a phase shifter. The integrated optical structure according to the present disclosure comprising an optical phased array 21;22 as shown on FIG. 7 further comprises a slab waveguide 300 formed on the substrate onto which the optical phased array 21;22 is formed and between the optical layer comprising an optical phased array 21;22 as shown on FIG. 7 and another optical layer. The slab waveguide 300 is in optical communication with the coupling sections 20 of the optical phased array 21;22. The slab waveguide 300 comprises a slab waveguide outcoupling structure 301 configured for transmission of optical beams 2 out of and/or for reception of optical beams 2 into the plane of the substrate. The coupling sections 20 optically coupled the optical beams 2 to and/or from the slab waveguide 300. The coupling sections 20 are identical.

Although the present disclosure has been illustrated by reference to specific embodiments, it will be apparent that the disclosure is not limited to the details of the foregoing illustrative embodiments, and that various changes and modifications can be made without departing from the scope thereof. The present embodiments are therefore to be considered in all respects as illustrative and not restrictive, the scope of the disclosure being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several elements recited in the claims. Any reference signs in the claims shall not be construed as limiting the respective claims concerned. The terms "first", "second", "third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments are capable of operating according to the present disclosure in other sequences, or in orientations different from the one(s) described or illustrated above.

What is claimed is:

1. An integrated optical structure for phase front engineering of optical beams, wherein the integrated optical structure comprises:
   a substrate;
   a plurality of optical layers formed on the substrate, wherein each of the optical layers comprises:
      an optical phased array comprising a plurality of optical waveguides; and
      a coupling section for each of the optical waveguides, wherein each coupling section is configured to control the phase of an optical beam coupling out of the optical waveguide; and
   a slab waveguide formed on the substrate and between two of the optical layers, wherein the slab waveguide is in optical communication with the coupling sections of the two optical layers, and wherein the slab waveguide comprises a slab waveguide outcoupling structure configured for transmission of optical beams out of or for reception of optical beams into the plane of the substrate.

2. The integrated optical structure according to claim 1, wherein the coupling sections of the optical layers are further configured to optically couple optical beams to or from the slab waveguide.

3. The integrated optical structure according to claim 1, wherein the coupling sections of the optical layers are identical.

4. The integrated optical structure according to claim 3, wherein the optical waveguides within each of the optical layers are periodically spaced in the plane of the substrate.

5. The integrated optical structure according to claim 4, wherein the optical waveguides of the two optical layers are in offset with respect to each other along a direction transverse to the substrate by half a period of the spacing of the optical waveguides within one of the coupling sections.

6. The integrated optical structure according to claim 5, wherein each of the coupling sections comprises a taper.

7. The integrated optical structure according to claim 6, wherein the integrated optical structure further comprises one or more intermediate coupling layers, wherein each intermediate coupling layer is formed on the substrate between one of the two optical layers and the slab waveguide, and wherein each of the intermediate coupling layers is configured to be in optical communication with one of the coupling sections of one of the optical layers and with the slab waveguide outcoupling structure.

8. The integrated optical structure according to claim 7, wherein each of the intermediate coupling layers comprises a plurality of intermediate waveguides, and wherein each intermediate waveguide is in optical communication with one of the optical waveguides at its coupling section and with the slab waveguide outcoupling structure.

9. The integrated optical structure according to claim 8, wherein:
   the optical waveguides within one of the optical layers have different dimensions along the plane of the substrate; or
   the intermediate waveguides within one or more of the intermediate coupling layers have different dimensions along the plane of the substrate.

10. The integrated optical structure according to claim 1, wherein the slab waveguide further comprises one or more optical phased arrays.

11. The integrated optical structure according to claim 1, wherein the slab waveguide further comprises one or more phase interrogators.

12. The integrated optical structure according to claim 1, wherein each of the optical phased arrays comprises:
   an input section; and
   a splitting section in optical communication with the input section and with the coupling sections.

13. The integrated optical structure according to claim 1, wherein the optical layers operate at different wavelengths.

14. A method for using the integrated optical structure according to claim 13, wherein the method comprises:
   emitting a first optical beam in a first optical layer of the integrated optical structure;
   allowing the first optical beam to couple from the first optical layer into the slab waveguide;
   transmitting the first optical beam out of the plane of the substrate via the slab waveguide outcoupling structure;
   receiving a second optical beam into the plane of the substrate via the slab waveguide outcoupling structure, wherein the second optical beam corresponds to the first optical beam having been reflected; and
   allowing the second optical beam to couple from the slab waveguide into a second optical layer of the integrated optical structure.

15. A method for manufacturing an optical integrated structure, wherein the method comprises:
   providing a substrate;
   forming a plurality of optical layers on the substrate, wherein each of the optical layers comprises:
      an optical phased array comprising a plurality of optical waveguides; and
      a coupling section for each of the optical waveguides, wherein each coupling section is configured to control the phase of an optical beam coupling out of the optical waveguide; and
   forming a slab waveguide on the substrate and between two of the optical layers, wherein the slab waveguide is in optical communication with the coupling sections of the two optical layers, and wherein the slab waveguide comprises a slab waveguide outcoupling structure configured for transmission of optical beams out of or for reception of optical beams into the plane of the substrate.

16. The method according to claim 15, wherein the coupling sections of the optical layers are further configured to optically couple optical beams to or from the slab waveguide.

17. The method according to claim 15, wherein the coupling sections of the optical layers are identical.

18. The method according to claim 17, wherein the optical waveguides within each of the optical layers are periodically spaced in the plane of the substrate.

19. The method according to claim 18, wherein the optical waveguides of the two optical layers are in offset with respect to each other along a direction transverse to the substrate by half a period of the spacing of the optical waveguides within one of the coupling sections.

20. The method according to claim 19, wherein each of the coupling sections comprises a taper.

* * * * *